United States Patent [19]

Baker

[11] Patent Number: 4,979,365

[45] Date of Patent: Dec. 25, 1990

[54] ELECTROTHERMALLY OPERATED ACTUATOR

[75] Inventor: William E. Baker, Houston, Tex.

[73] Assignee: Actronics Incorporated, Waltham, Mass.

[21] Appl. No.: 412,187

[22] Filed: Sep. 25, 1989

[51] Int. Cl.⁵ .............................................. F03G 7/06
[52] U.S. Cl. ..................................... 60/528; 60/527
[58] Field of Search ......................... 60/527, 528, 529

[56] References Cited

U.S. PATENT DOCUMENTS

| | | | |
|---|---|---|---|
| 3,168,805 | 2/1965 | Flevry | 60/531 |
| 3,431,726 | 3/1969 | Iverson | 60/530 |
| 3,500,634 | 3/1970 | Waseleski, Jr. | 60/528 |
| 3,937,019 | 2/1976 | Renner | 60/527 |
| 4,081,963 | 4/1978 | Stove | 60/528 |
| 4,235,413 | 11/1980 | Baker | 60/531 X |

Primary Examiner—Allen M. Ostrager
Attorney, Agent, or Firm—Bill B. Berryhill

[57] ABSTRACT

An improved electrothermally operated actuator of the type in which a piston is translatable in a piston housing in response to electrical heating of an expandable working fluid in fluid communication with one end of the piston. The working fluid is at least partially disposed in a tube assembly which is connected in an electric circuit which is closed and opened, in response to selected events, to heat or cool the working fluid to effect movement of the piston between retracted and extended terminal positions. An improved sealing assembly prevents leakage of working fluid from the piston housing. The actuator may be connected through a power translating assembly to a rotating element of an operable device translating linear movement of the actuator to rotating movement of the rotating element.

17 Claims, 2 Drawing Sheets

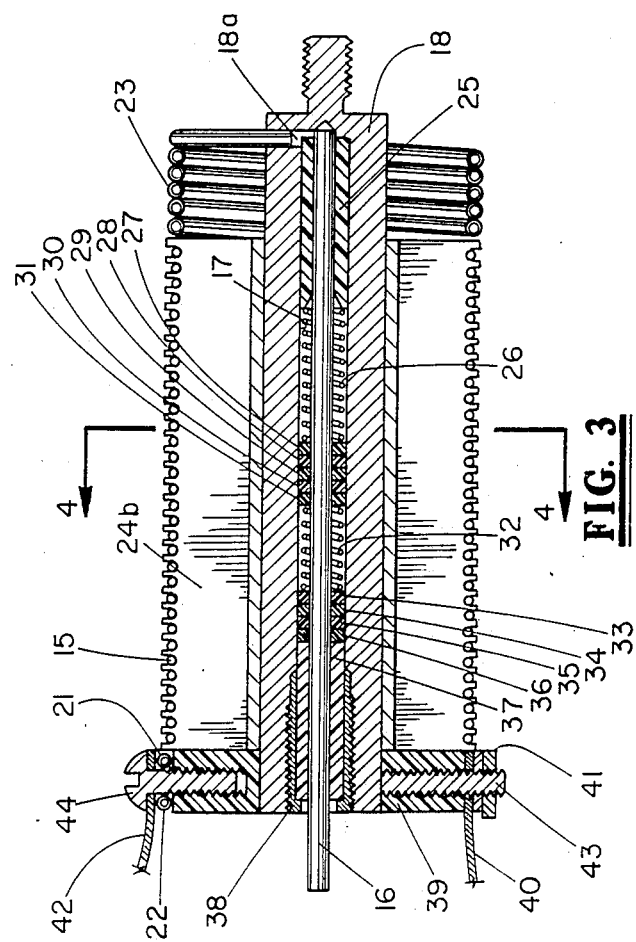
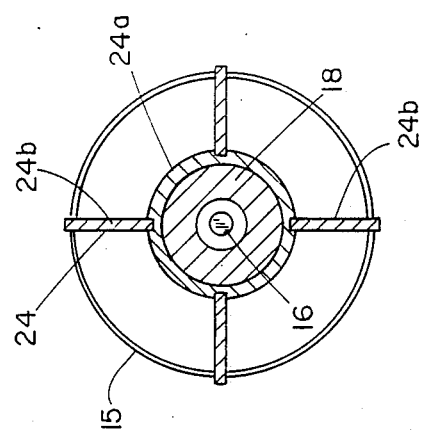

ELECTROTHERMALLY OPERATED ACTUATOR

BACKGROUND OF THE INVENTION

1. Field of the Invention

The present invention pertains to electrothermally operated actuators of the type in which a piston is translatable in a piston housing in response to electrical heating of an expandable working fluid. In particular, the present invention pertains to an improved electrothermally operated actuator suitable for actuation of an operable device such as a valve.

2. Description of the Prior Art

There are many types of actuators for actuating operable devices: manual, hydraulic, pneumatic, electrical, or combinations thereof. Because of efficiency, compactness, remote controlling and other characteristics, electrically operated actuators are preferred in many situations. Current electric actuators, particularly of the linear type, utilize either solenoids or motor-gear trains rotating a ball screw to obtain linear motion of a threaded shaft.

Solenoid type actuators are typically used in applications such as water valves on dish washers and washing machines and numerous other applications in industry, office machinery, homes, vending machines, etc. However, solenoids are limited to operation of relatively small devices since the piston force produced is about one pound of force per cubic inch of solenoid volume.

A more expensive alternative to solenoid actuators are those which utilize a motor-gear train driving a ball screw. This type of actuator has a number of moving parts and is correspondingly less reliable than the solenoid. It is capable of producing larger forces for relatively large loads and is used where cost, weight and bulk are not problems. Obviously, the linear movement produced by an actuator of the motor-gear train type is much slower than that of a solenoid actuator.

In summary, the solenoid actuator has only one moving part, but low available force per unit volume. The motor-gear train actuator produces greater forces but is slower, more complex, relatively expensive, etc. Obviously, there is much room for improvement in electrically powered actuators, particularly in the area of moderate forces and speedy operation.

In the past, attempts have been made to pressurize a piston-cylinder actuator by electrically heating an expandable fluid in communication therewith. Examples may be seen in U.S. Pat. Nos. 2,322,762; 4,079,589; and 4,711,270. Most such efforts have been only moderately successful and have produced actuators too slow to compete with the solenoid actuator which has an operating time of a fraction of a second.

The present applicant, in a previous U.S. Pat. No. 4,235,413, disclosed an electrothermally operated actuator in which an expandable fluid, such as water, is heated in a tube and expanded into steam, the steam translating a piston within a cylinder or housing for transmitting force to an operable device, e.g. a valve. By controlling the supply voltage, the fluid heats up and actuates a valve from open to close in about twenty seconds. Equilibrium temperature is reached and the valve remains closed as long as the current is on. When the supply voltage is switched off, the fluid cools and condenses and the valve opens, under a spring load, in about twenty seconds. While this valve actuator is a substantial improvement over the prior art, its speed and power consumption could be improved.

SUMMARY OF THE PRESENT INVENTION

The present invention is an electrothermally operated actuator of the type in which a piston is translatable in a piston housing in response to electrical heating of an expandable working fluid in fluid communication with the housing and one end of the piston. The working fluid, e.g. water, is at least partially disposed in a coiled tube through which an electric current may be passed for heating of the tube and the working fluid therein. The tube is part of an electric circuit which includes an electric power source. The electric circuit also includes a first switch which is operable to close the electric circuit for selectively passing a current through the tube and the working fluid to effect movement of the piston from a retracted terminal position within the piston housing to an extended terminal position in which a portion of the piston extends out of the piston housing. The electric circuit also includes a second switch which is responsive to movement of the piston from its retracted terminal position to its extended terminal position to open the circuit allowing the working fluid to cool. A biasing mechanism is connected to the piston for returning the piston and maintaining it in its retracted terminal position when the electric circuit is opened. The electric circuit may also include a third switch which is responsive to movement of the piston from the retracted terminal position to its extended terminal position to open the circuit and prevent subsequent closing thereof until the piston has completely returned to its retracted terminal position. Other protective features are disclosed.

In a preferred embodiment of the invention, the electrothermally operated actuator of the present invention is connected through a power translating assembly to a rotating element of an operable device such as a valve, the power translating assembly translating linear movement of the piston to rotating movement of the rotating element. The translating assembly may include a clutch member which is engageable with the rotating element of the operable device to effect rotation thereof upon movement of the piston from its retracted terminal position to its extended terminal position. In a preferred embodiment, the clutch member is disengageable during return of the piston member to its retracted terminal position so that the rotating element rotates only during movement of the piston toward its extended terminal position.

The electrothermally operated actuator of the present invention is provided with an improved sealing assembly to prevent leakage of working fluid from the piston housing. The sealing assembly may include an axially spaced first and second seal surrounding the piston and sealingly engaging the piston housing. One side of the first seal is exposed to working fluid within the housing and one side of the second seal is exposed to the environment into which the piston projects from the housing. A sealing fluid is disposed in an annular space surrounding the piston between the first and second seals, the sealing fluid having a substantially lower vapor pressure than that of the working fluid. In a preferred embodiment, the seal assembly includes a helically wound spring disposed in the annular space between the first and second seals biasing the first and second seals away from each other.

The improved electrothermally operated actuator of the present invention provides an actuator which produces a power stroke comparable in speed to those of solenoids with a stroke time of under one second. However, it generates a force from ten to twenty times that of a solenoid of comparable size and weight. It has only one moving part, the piston, compared to numerous moving parts of a conventional motor-gear train actuator. The working fluid of the actuator of the present invention is uniquely contained by a combination piston-housing seal and low pressure seal buffer fluid which also acts as a lubricant. The resulting actuator is power efficient, compact and relatively maintenance free. Other objects and advantages of the invention will be apparent from reading the description which follows in conjunction with the accompanying drawings.

BRIEF DESCRIPTION OF THE DRAWINGS

FIG. 3 is a longitudinal view, partially in section, of the electrothermally operated actuator of FIGS. 1 and 2, according to a preferred embodiment of the invention; and FIG. 4 is a cross-sectional view, taken along lines 4—4 of FIG. 3, of the electrothermally operated actuator of the present invention.

DESCRIPTION OF A PREFERRED EMBODIMENT

Figure 1:
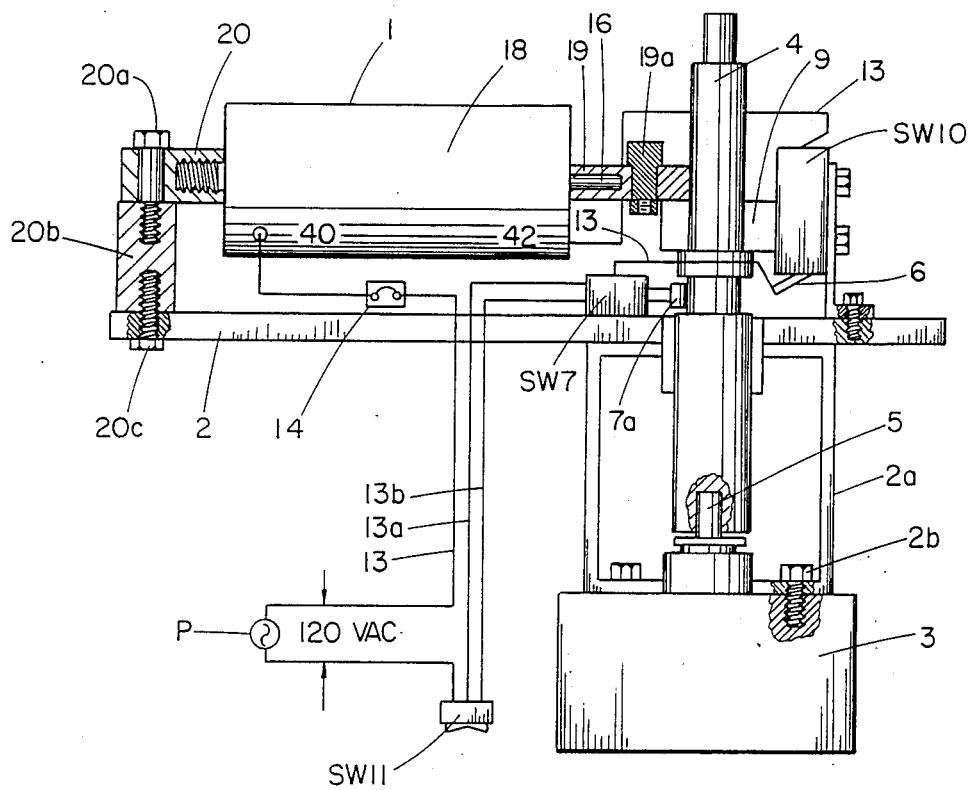
FIG. 1 is an elevation view of an electrothermally operated actuator connected to an operable device, such as a valve, according to a preferred embodiment of the invention.
Figure 2:
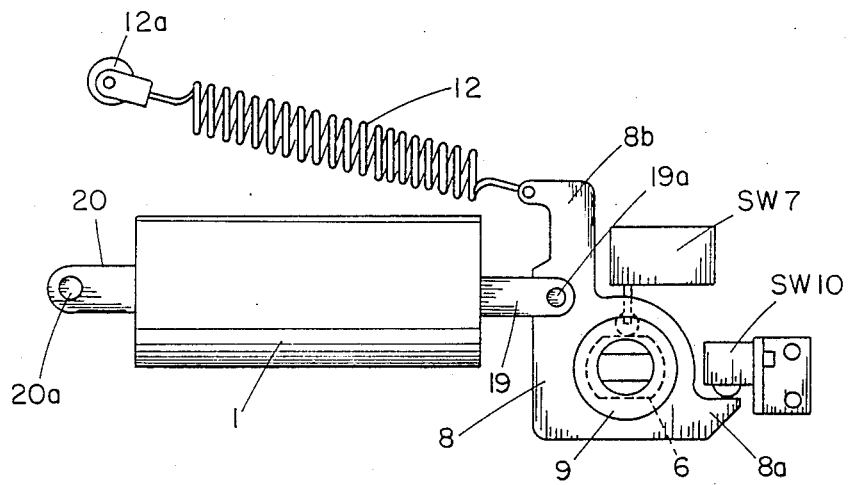
FIG. 2 is a plan view of the actuator and operable device of FIG. 1.

Referring first to FIGS. 1 and 2, an electrothermally operated actuator 1 is mounted on a base plate 2 which is attached by suitable mounting brackets 2a and screws 2b to an operable device such as a ball valve 3. The ball valve 3 has an operating stem 5 for operation of the closure member (not shown) thereof. Stem 5 is extended by extension shaft 4. The extension shaft 4 is machined so as to provide a cam 6 having four lobes or operating points essentially at ninety degree intervals about its periphery. A crank arm 8 is connected through a one way clutch bearing 9 to the stem extension 4. The crank arm 8 is, in turn, connected to a piston 16 (more fully described hereafter) of the actuator 1 by a clevis 19 of nonconducting material such as nylon and a cooperating pin 19a. The opposite end of the actuator 1 is anchored to the base 2 through a nylon clevis 20, a cylindrical mounting member 20b and cooperating bolts or screws 20a and 20c. Both of the nylon clevises or linkages 19 and 20 serve to insulate the actuator 1 from other components.

It will be noted that the crank 8 is connected to one end of a helically wound biasing spring 12 the opposite end of which is attached to a mounting member 12a on the base plate 2. The spring 12 biases the crank member and consequently the piston 16 toward a retracted terminal position as shown in FIGS. 1 and 2.

There is an electric circuit associated with the components of the present invention. The circuit includes a power source P and a common lead or wire 13 connected at terminals 40 and 42 of the actuator 1. The details of the actuator 1 will be described hereafter. Also connected in the circuit are first and second switches 11 and 7 which are connected by a three-way switching circuit. Both the switches 11 and 7 are preferably single pole, double throw (SPDT) switches connected by three electrical conductors. The common lead 13 connects common terminals. A second wire 13a connects the normally open (NO) terminals and a third wire 13b connects the normally closed (NC) terminals. Also connected in series with switch 7 and 11 through the common lead 13 is a third switch 10 which is a single pole, single throw (SPST) switch. The circuit may also include a resettable circuit breaker 14. The switch 11 is a remotely operable switch. Switch 7 has a cam follower 7a and operates in response to rotation of the cam 6 on the valve stem extension 4. Switch 10 is a limit switch which operates, sequentially with switch 7, in response to contact with the crank 8, being closed when engaged by extension 8a thereon, and opened, in response to ninety degree rotation of the stem extension 4, by engagement with extension 8b of the crank 8.

Attention is now specifically directed to FIGS. 3 and 4 for a better understanding of the actuator 1. Actuator 1 includes a hollow cylinder or piston housing 18, closed at one end, and in which is disposed an axially translatable piston 16. Piston 16 is positioned in a cylindrical bore 17 of the housing 18 by non-metallic bearings 25 and 37. These bearings 25, 37 prevent scoring of the piston 16, allowing dust particles entrained on the piston to be imbedded in the non-metallic material thereof to serve as a polishing matrix. The piston projects out of one end of the housing 18 and is free to move between a retracted terminal position, as illustrated in FIG. 3, and an extended terminal position in which a portion of the piston 16 extends out of the piston housing 18.

Between the two bearings 25 and 37 is a unique dual seal system which includes a pair of compression springs 26 and 32 and a pair of axially spaced seal assemblies. The first seal assembly includes a washer 27 of a material such as Delrin AF which rests against the spring 26, a Teflon washer 28, an elastomeric ring 29 of a suitable synthetic rubber such as a Buna N or a Viton compound, a Teflon washer 30 and another Delrin AF washer 31. The spring 32 bears against washer 31 and also against a Delrin AF washer 33 of the second seal assembly. The second seal assembly also includes a Teflon washer 34, an elastomeric ring 35 and a Teflon washer 36 which bears against the bearing 37. The entire seal and bearing assembly is retained by a threaded member 38 which has an oversize opening for the piston 16 to pass through.

The axial loads produced by the springs 26 and 32 force the elastomeric seals 29 and 35 to deform radially (inwardly against the piston 16 and outwardly against the bore 17 of the hollow cylinder 18) effecting seals on both the bore and the piston. The Teflon rings on either side of the elastomeric seals 29 and 35 insure a zero clearance between them and the bore and the piston to completely contain the elastomeric seals 29 and 35, preventing these seals from deforming at high pressure. The Delrin rings support the springs and protect the Teflon from creep due to spring and/or pressure loads. Disposed in the annular space surrounding the piston between the first and second seal assemblies is a sealing fluid selected for characteristics of lubrication and vapor pressure. It is sufficient to state that the sealing fluid may be of a low-vapor-pressure silicone, such as methyl alkyl silicone, when the working fluid adjacent the first seal assembly is water or steam.

Surrounding the piston housing 18, in a helical coil, is a tube assembly which includes a small metallic tube 15, e.g. stainless steel, which terminates in a terminal tube 21 and a seal closed at 22. The opposite end of the tube 15 is connected to a cooling tube 23, e.g. stainless steel. The opposite end of the cooling tube 23 is in fluid communication through a port 18a with the bore 17 of the cylinder 18 and consequently with the lower portion of the piston 16. It will be noted that the tube 15 is positioned by an insulating coil form 24, having a central core 24a which is installed around the cylinder 18 and includes radial spokes 24b having notches to retain the tube 15. This protects the tube 15 from shock or mechanical damage and prevents adjacent turns thereof from touching one another. The tube 15 is filled with a vaporizable fluid such as water.

One end of the tube assembly 15, 21, 23 is connected by threaded screw 44 to electrical terminal 42. The other electrical terminal 40 is connected through a threaded metallic member 43 to the piston housing 18. Thus the electrical circuit previously described may be completed through the tube assembly 15, 21, 23 and the piston housing 18. Flow of electrical energy through the length of the tube assembly 15, 21, 23 causes heating of the tube assembly and its contents (water in this case). This is known as Joule heating. Heating converts the fluid (water) to vapor, generating hydrostatic pressure in housing 18. The wattage density is made high enough by a selection of supply voltage, heater tube resistance and tube surface area of the heater tube 15 to heat and vaporize the water therein generating 3000 PSI steam pressure in approximately 0.9 seconds. This fluid (water) is quickly heated by enclosing it in a small cross section electrically resistive metal tube and flowing a high current through the tube to generate high wattage. Fast temperature rise is due to the fact that the watts per thermal mass (metal and fluid) is high; the flow path of heat through the mass is short; and the watts loss rate to ambient is slower than watts generation, due to low surface area of a small tube.

The quick heating of the water quickly generates steam at a near critical temperature which is slightly over 3000 PSI. This high pressure steam will then generate a hydrostatic pressure which acts on one end of the piston 16 forcing it to move from a retracted terminal position, within housing 18, to an extended terminal position in which it projects out of the housing 18.

Steam at 3100 PSI requires metal and water temperature of approximately 700 degrees F. The loss of heat to ambient air is in proportion to the difference between the metal and water temperature and the ambient temperature. In addition, at temperatures above 500 degrees F., there is also considerable loss of radiant heat energy. Thus, when the electric circuit is open (power interrupted), the retraction stroke of piston 16 is correspondingly fast. The return load, in this case produced by a spring 12, may be a spring selected of a spring rate as low as practical so that during the stroke, the pressure change required and consequently the temperature change of the steam is also low, increasing the piston retraction speed during the cooling cycle.

By operating near the critical point of water, the pressure increase per degree F. change in temperature becomes quite large as compared with that at lower temperatures. For example, the pressure change per degree F. at 300 degrees F. is 0.992 PSI, while the pressure change per degree at 700 degrees F. is 20.4 PSI (more than twenty times that at 300 degrees F.). This requires a smaller temperature change during cooling at high temperatures than at lower temperatures. The pressure decrease for piston retraction thus occurs faster at less temperature change. A further increase in cooling rate is provided by the return of the water that was displaced from the heater tube 15 into the cooling tube 23. When this water reenters the heating tube 15, the steam in the tube is cooled by direct contact with the turbulent flow of relatively cooler water and the cooling rate is further increased.

Accompanying this fast temperature change is a fast pressure decrease which, acting with a low spring rate, causes a fast retraction of the piston. The retraction speed of the piston is far in excess of what it would be were it not for the combination of all of these factors. Thus the speed and force of the piston during the power stroke and the speed during the retraction stroke is far in excess of what it would be were it not for the combinations of the present invention.

STATEMENT OF OPERATION

Referring now to all of the drawings, operation of the present invention will be described. For purpose of description it will first be assummed that the actuator 1 is in the fully retracted, nonenergized position illustrated in FIGS. 1 and 2. It will also be assummed that the operable device 3 is a ball valve which is in a closed position. The roller follower 7a of switch 7 is at a switching point of the cam 6 and the NO terminal thereof is opened. The remote switch 11 is assummed to be in the opened position of the NC terminal. The circuit breaker 14 is closed and limit switch 10 is closed by the crank arm 8 with the actuator piston fully retracted. In this condition, no current is flowing through the heater tube 15 of the actuator 1.

To open the ball valve 3, the switch 11 is manually switched to the closed position of the NC terminal. Since switch 7 is in the closed position of the NC terminal, current will flow through the common lead 13, limit switch 10, the heater tube 15, wire 13b and the NC terminals of switches 7 and 11 all in series with the power supply P. As previously described, the wattage density is such as to generate 3000 PSI steam pressure in about 0.9 seconds. This steam pressure acting against one end of the piston 16 forces the piston 16 out of the housing 18, moving the crank arm 8 in the direction of the arrow as shown in FIG. 2. Movement of the crank arm 8 rotates the stem extension 4, through the one-way clutch bearing 9, turning the stem extension 4 and the stem 5 through an angle of ninety degrees, opening the ball valve 3. During this movement, the crank arm 8 stretches return spring 12, building up a sufficient force in the spring to eventually return the crank arm.

When the crank arm 8 has rotated ninety degrees, the extension 8b thereof contacts the limit switch 10 and moves it to the open position. At substantially the same time, the cam 6 opens the NC terminal of switch 7. Current flow is thus interrupted to the heater tube 15 which is at a temperature of over 600 degrees F. Once current is interrupted, the heater tube 15 rapidly cools toward ambient temperature and the actuator piston 16 returns into the actuator housing 18, being forced thereinto by the pull of spring 12. Once the piston 16 and arm 8 have been fully retracted, the extension 8a of the crank closes the limit switch 10 and the system is ready for the next power stroke.

At this point, no current is flowing until the remote switch 11 is again actuated and the cycle repeated. This time, the power stroke will close the ball valve 3 which had been opened by the previous power stroke and the current will again be switched off letting the shaft retract with the closed valve ready to be opened by the next power stroke.

The limit switch 10 functions to insure power cutoff at full piston stroke in the event the remote switch 11 is thrown during a cooling mode while piston 16 is retracting but before being fully retracted. If the limit switch 10 were not in the circuit, the shaft rotation would not be sufficient to cam the switch 7 to the power off condition of switch 7 and the heater tube would overheat and might self destruct. The reset circuit breaker 14 is provided to guard against this condition. The circuit breaker or switch 14 is in series with the common switch lead 13 and in series with the three switches 7, 10 and 11. It is sized to open in about 1.5 seconds. This is fast enough to prevent heater tube damage but not fast enough to open during normal operation of the actuator.

The electrothermally operated actuator of the present invention has a number of features which in combination result in many improved characteristics. Most importantly, it operates at a speed of at least twenty times that of self-contained thermal actuators of the prior art. The combined features of the present invention allow use of a smaller diameter heater tube and thinner tube wall at a given pressure. This results in a smaller cross section tube wall, smaller cross section of fluid and less thermal mass. These features permit higher operating pressure (small diameter lowers hoop stress in the formula $S=PD/2T$). The higher operating pressure permits a smaller diameter piston in the actuator and allows smaller volume fluid change during the piston stroke. The smaller volume change during the piston stroke allows smaller fluid fill volume. The smaller fluid fill volume allows a small long tube which, when of resistive metal, has sufficient resistance to permit use of 120V electrical supply without the current exceeding 10 AMPS. This allows use of lower cost, standard switches and other electrical components and also eliminates the need for a voltage transformer, thereby reducing cost, weight and bulk of the system.

The smaller thermal mass of the tube and fluid allows a higher wattage per thermal mass within desired current limits, causing faster heating, pressure and piston power stroke. The small diameter tube has a short heat flow path from inside to surface resulting in faster heating and cooling thereby producing faster piston power stroke and piston retraction stroke. The fast power stroke (0.9 seconds) utilized on both open and closing of a valve, results in opening and closing of a valve in less than one second. The use of a one-way or overriding clutch to rotate a valve stem in one direction for both opening and closing permits use of the power stroke for both valve operations. The use of a combination of a four lobed cam operating a control switch and a limit switch limiting the power stroke by opening the circuit insures that the valve would be turned at an angle of ninety degrees on each operation even if the remotely operated switch were reversed before the cooling stroke had been completed.

A unique sealing system for the piston cylinder actuator is utilized. With this sealing system, the housing bore and the piston surface are sealed against high pressure without metal contact. This prevents scratching of these surfaces which would cause leaking of the sealed fluid. The nonmetallic soft bearings used with the present invention actually polish the piston. Instead of sealing the water fill (a moderate vapor pressure fluid) directly with a spring loaded seal, a buffer fluid having a low vapor pressure is sealed and another seal separates the two fluids at their interface. Because of this the molecular layer of the buffer fluid, adsorbed on the piston, will lose less due to evaporation when the piston is exposed to the atmosphere.

As can be seen, the present invention utilizes a combination of many unique features to produce an electrothermally operated actuator much superior to those of the prior art. Although a single embodiment of the invention has been described herein, many variations can be made by those skilled in the art without departing from the scope of the invention. Accordingly, it is intended that the scope of the invention be limited only by the claims which follow.

I claim:

1. An improved electrothermally operated actuator of the type in which a piston is translatable in a piston housing in response to electrical heating of an expandable working fluid in fluid communication with said housing and one end of said piston, said working fluid being at least partially disposed in tube means through which an electric current may be passed for heating of said tube means and said working fluid herein, said tube means being in an electric circuit which includes a power source and the improvement of which comprises:

first switch means operable to close said electric circuit for selectively passing said current through said tube means and said working fluid to effect movement of said piston from a retracted terminal position within said piston housing to an extended terminal position in which a portion of said piston extends out of said piston housing;

second switch means responsive to movement of said piston from said retracted terminal position to said extended terminal position to open said circuit allowing said working fluid to cool;

said electric circuit including a time delay circuit breaker which opens said circuit within a predetermined time of closing thereof should said circuit not be opened by other switch means; and biasing means connected to said piston for returning and maintaining said piston in said retracted terminal position when said electric circuit is open.

2. An improved electrothermally operated actuator as set forth in claim 1 in which each of said first and second switch means has a common terminal, a normally open (NO) terminal and a normally closed (NC) terminal, a first wire connecting said common terminals, a second wire connecting said NO terminals and a third wire connecting said NC terminals.

3. An improved electrothermally operated actuator as set forth in claim 2 in which said piston is connected to an operable device and in which said first switch means is remote from said operable device, said second switch means being engageable by said operable device for opening said NC terminal and closing said NO terminal in response to predetermined movement thereof.

4. An improved electrothermally operated actuator as set forth in claim 3 in which closing of said first switch means by closing the NC terminal thereof completes a circuit through the NC terminal of said second switch means to heat said working fluid and effect movement of said piston to said extended position for operating said operable device.

5. An improved electrothermally operated actuator as set forth in claim 4 in which movement of said operable device in response to movement of said piston to said extended position opens said NC terminal and closes said NO terminal of said second switch means, opening said electric circuit, allowing said working fluid to cool and allowing said biasing means to return said piston means to said retracted position.

6. An improved electrothermally operated actuator as set forth in claim 5 in which subsequent closing of said first switch means by closing the NO terminal thereof completes a circuit through the closed NO terminal of said second switch means to heat said working fluid and effect movement of said piston to said extended position for further operating of said operable device.

7. An improved electrothermally operated actuator as set forth in claim 6 including third switch means which opens in response to movement of said piston to said extended position and does not close until said piston returns to said retracted position, preventing subsequent operation of said operable device until said piston is completely retracted.

8. An improved electrothermally operated actuator as set forth in claim 1 in which said piston is connected through power translating means to a rotating element of an operable device, said power translating means translating linear movement of said piston to rotating movement of said rotating element, cam means being associated with said rotating element for operating said second switch means upon a predetermined amount of rotation of said rotating element.

9. An improved electrothermally operated actuator as set forth in claim 8 in which said translating means comprises a clutch member engageable with said rotating element to effect said rotating movement thereof upon movement of said piston from said retracted terminal position to said extended terminal position.

10. An improved electrothermally operated actuator as set forth in claim 9 in which said clutch member is disengageable upon return of said piston member to said retracted terminal position so that said rotating element rotates only during movement of said piston toward said extended terminal position.

11. An improved electrothermally operated actuator as set forth in claim 9 in which said translating means comprises a crank member by which said piston is connected to said clutch member and to said biasing means.

12. An improved electrothermally operated actuator as set forth in claim 11 in which said biasing means comprises a spring member connected to said crank member biasing said crank member in a direction for returning said piston to said retracted terminal position.

13. An improved electrothermally operated actuator as set forth in claim 11 in which said crank member is connected to said piston by a non-conducting connector electrically insulating said power translating means and said operable device from said piston.

14. An improved electrothermally operated actuator as set forth in claim 11 in which said crank member is engageable with third switch means in said electric circuit upon movement of said piston to said extended terminal position to open said circuit and prevent subsequent closing thereof until said piston returns to said retracted terminal position.

15. An improved electrothermally operated actuator as set forth in claim 14 in which said crank member is engageable with said third switch means on return of said piston to said retracted terminal positions to close said circuit.

16. An improved electrothermally operated actuator of the type in which a piston is translatable in a piston housing in response to electrical heating of an expandable working fluid in fluid communication with said housing and one end of said piston, said working fluid being at least partially disposed in tube means through which an electric current may be passed for heating of said tube means and said working fluid therein, said tube means being in an electric circuit which includes a power source and the improvement of which comprises:

first switch means operable to close said electric circuit for selectively passing said current through said tube means and said working fluid to effect movement of said piston from a retracted terminal position within said piston housing to an extended terminal position in which a portion of said piston extends out of said piston housing;

second switch means responsive to movement of said piston from said retracted terminal position to said extended terminal position to open said circuit allowing said working fluid to cool;

third switch means responsive to movement of said piston from said retracted terminal position to said extended terminal position to open said circuit and prevent subsequent closing thereof until said piston has returned to said retracted terminal position; and biasing means connected to said piston for returning and maintaining said piston in said retracted terminal position when said electrical circuit is open.

17. An improved electrothermally operated actuator as set forth in claim 16 in which said electric circuit includes a time delay circuit breaker which opens said circuit within a predetermined time of closing thereof should said circuit not be properly opened by said second or third switch means.

* * * * *